(12) United States Patent
Poncelet et al.

(10) Patent No.: US 8,133,316 B2
(45) Date of Patent: Mar. 13, 2012

(54) PROCESS FOR PREPARING AN ASPHALT MIXTURE

(75) Inventors: Karel Poncelet, Brussels (BE); Gerrit Gijsbertus Van Bochove, Rosmalen (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/056,243

(22) PCT Filed: Jul. 15, 2009

(86) PCT No.: PCT/EP2009/059086
§ 371 (c)(1),
(2), (4) Date: Feb. 22, 2011

(87) PCT Pub. No.: WO2010/012597
PCT Pub. Date: Feb. 4, 2010

(65) Prior Publication Data
US 2011/0146539 A1 Jun. 23, 2011

(30) Foreign Application Priority Data

Jul. 30, 2008 (EP) .................................... 08305439

(51) Int. Cl.
C08L 95/00 (2006.01)
C04B 24/36 (2006.01)
C10C 3/00 (2006.01)
E01C 19/10 (2006.01)

(52) U.S. Cl. .................. 106/281.1; 106/273.1; 106/278; 208/22; 208/39; 366/6; 366/7; 366/10; 366/14; 366/24

(58) Field of Classification Search ............... 106/273.1, 106/278, 291.1; 208/22, 39; 366/6, 7, 10, 366/14, 24
See application file for complete search history.

(56) References Cited

U.S. PATENT DOCUMENTS

| | | | |
|---|---|---|---|
| 3,832,200 A | 8/1974 | Kennel et al. ............. 106/281 R |
| 4,256,506 A | 3/1981 | Mendenhall .................. 106/280 |
| 4,481,039 A | 11/1984 | Mendenhall .................. 106/281 |
| 5,277,710 A | 1/1994 | Aho ............................ 106/273.1 |
| 5,303,999 A * | 4/1994 | Nath et al. ........................ 366/25 |
| 5,322,367 A * | 6/1994 | Nath et al. ......................... 366/7 |
| 5,385,401 A * | 1/1995 | Nath ................................. 366/7 |
| 5,573,844 A | 11/1996 | Donovan et al. .............. 428/240 |
| 5,579,587 A * | 12/1996 | Morrison et al. ................ 34/136 |
| 5,766,333 A * | 6/1998 | Lukens .......................... 106/280 |
| 5,810,471 A * | 9/1998 | Nath et al. ........................ 366/25 |
| 6,077,340 A * | 6/2000 | Doyle ............................ 106/225 |
| 6,340,240 B1 * | 1/2002 | Swisher et al. .................. 366/25 |
| 6,588,973 B1 * | 7/2003 | Omann ............................ 404/17 |
| 7,150,420 B2 * | 12/2006 | Packer et al. .................... 241/23 |
| 7,357,562 B2 * | 4/2008 | Hawkins ......................... 366/23 |
| 7,758,235 B1 * | 7/2010 | Collette ............................ 366/7 |
| 7,811,372 B2 * | 10/2010 | Nigen-Chaidron et al. .. 106/278 |
| 2008/0310249 A1 * | 12/2008 | Musil .............................. 366/23 |
| 2011/0110177 A1 * | 5/2011 | Velsor .............................. 366/22 |
| 2011/0146539 A1 * | 6/2011 | Poncelet et al. ............... 106/661 |

FOREIGN PATENT DOCUMENTS

| | | |
|---|---|---|
| DE | 3333673 | 4/1985 |
| DE | 102004055474 | 5/2006 |
| EP | 0589740 | 3/1994 |
| KR | 100740671 | 7/2007 |
| WO | WO9611241 | 4/1996 |
| WO | WO9720890 | 6/1997 |
| WO | WO9847965 | 10/1998 |
| WO | WO0162852 | 8/2001 |
| WO | WO2008084014 | 7/2008 |

OTHER PUBLICATIONS

Kristjansdottir Olof: Warm Mix Asphalt for Cold Weather Paving, Thesis submitted in partial fulfillment of the requirements for the degree of master of science in civil engineering, University of Washington, Jan. 1, 2006, pp. 1-127, XP002513181.
Chowdhury Arif, et al: A Review of Warm Mix Asphalt, Dec. 2008, XP002553107, retrieved from internet: URL:http://swutc.tamu.edu/publications/technicalreports/473700-00080-1.pdf, p. 11-12.

* cited by examiner

*Primary Examiner* — Anthony J Green
(74) *Attorney, Agent, or Firm* — Charles W. Stewart

(57) ABSTRACT

A process for preparing an asphalt mixture from recycled asphalt pavement (RAP), virgin aggregate, filler and first and second binder materials, is disclosed. The process comprises steps of transporting RAP through a first drum; transporting virgin aggregate through a second drum; adding a first binder material to the RAP in the first drum to provide treated RAP; supplying the treated RAP, the virgin aggregate, filler and a second binder material to a mixing zone; and mixing to provide the asphalt mixture.

32 Claims, 3 Drawing Sheets

PROCESS FOR PREPARING AN ASPHALT MIXTURE

PRIORITY CLAIM

The present application claims priority of European Patent Application No. 08305439.5 filed Jul. 30, 2008.

FIELD OF THE INVENTION

The invention relates to a process for preparing an asphalt mixture that is suitably used to prepare asphalt pavements.

BACKGROUND OF THE INVENTION

Road surfaces (known as pavements) are routinely constructed from asphalt mixture, which is a composite of binder, aggregate and filler (mineral powder). For most pavements, the binder is bitumen, a viscous liquid or a solid consisting essentially of hydrocarbons and their derivatives. The asphalt mixture is prepared in an asphalt mix plant, having facilities for heating and mixing the components. It is necessary to heat aggregate to remove any moisture and to raise it to a temperature suitable for coating with the binder. The removal of moisture is necessary to allow adhesion of the binder to the aggregate. An aggregate dryer/heater typically consists of a large rotating metal drum, heated by a gas or oil burner. The drum is mounted at a slight incline, and the aggregate is dried and heated as it passes through the drum. The heated aggregate is then mixed with binder in a mixing zone, e.g. in a pug mill in a batch process or in the mixing zone of a drum mixer in a continuous process.

It has become increasingly common to incorporate recycled asphalt pavement (RAP) into asphalt mixtures. The RAP is reclaimed from old road surfaces and consists of aggregate and aged binder. During its service life, the binder contained in upper road surfaces is subject to oxidation due to exposure to oxygen in the atmosphere and to UV light. The aged binder is harder and causes pavement embrittlement. The chemical nature of the binder can be characterized by four different fractions: saturates, aromatics, resins and asphaltenes. The changes in the chemical nature of the binder can be assessed by separation techniques such as a combination of heptane precipitation and High Pressure Liquid Chromatography (HPLC) or by Clay Gel Analysis (ASTM D 2007). During the ageing process, the asphaltene and resin contents increase whereas the saturate and aromatic content decrease.

The RAP is typically crushed and sieved before it is recycled. It is combined with virgin aggregate, with filler and with new binder to prepare an asphalt mixture. Up to 25 wt % RAP (based upon the weight of the asphalt mixture) may be incorporated simply by adding the RAP directly to the mixer of an asphalt mix plant. The RAP is not pre-heated, so the virgin aggregate is overheated such that a temperature exchange can occur in the mixer whereby the RAP is heated to the required temperature.

It is desirable to incorporate higher percentages of RAP into asphalt mixtures because it is a more sustainable and lower cost product than virgin aggregate. To incorporate greater than 25 wt % RAP, indirect heating is insufficient to bring the mixture to the desired temperature. Therefore it is typical to pre-heat the RAP in a drum that is especially designed for heating RAP. This drum, usually known as the parallel drum, typically consists of an inclined steel drum with a burner mounted at the higher end. The RAP is dried and heated to a temperature of about 110-130° C. Higher temperatures are not used because of the risk that the binder in the RAP will oxidise and harden. It is usually still necessary to overheat the virgin aggregate such that the RAP can be further heated by temperature exchange in the mixer. It is possible to achieve the required mixing temperatures with a greater quantity of RAP, e.g. up to about 60 wt %.

It is important to ensure that the RAP is entirely broken down into its components parts during the mixing phase. If the RAP is not fully broken down, the resulting asphalt mixture may not be sufficiently homogeneous and the mechanical properties of the resulting asphalt pavement may suffer. The European norm EN 13108-7 on porous asphalt states that the use of RAP should not exceed 10% in top layers and 20% in lower layers unless the customer and the mix producer have sufficient know-how to produce durable asphalt mixtures. Maintaining high temperatures is one way to encourage disintegration of the RAP, but it is desirable to reduce the temperature of the asphalt mix preparation for environmental reasons and to reduce energy consumption and costs.

DE 10 2004 055 474 discloses a method for producing a bituminous composition for road construction, wherein the composition incorporates RAP. An additive such as flux oil is added to RAP to facilitate the processing of the RAP and the resulting asphalt production.

It has also become increasingly desirable to produce asphalt mixtures by so-called warm mix processes wherein the components are not heated above 130° C. Warm mix processes are described in EP 863 949, EP 977 813 and EP 1 263 885. Warm mix processes have lower energy requirements than conventional hot mix processes and therefore have environmental benefits. The prior art describes warm mix processes wherein a soft binder material is mixed with aggregate, and then a hard binder material, possibly in the form of an emulsion or a foam, is added to the mixture of soft binder and aggregate. It has proved difficult to use RAP in warm mix processes because at the warm temperatures there can be insufficient disintegration of the RAP, leading to inhomogeneous asphalt mixtures.

The present inventors have sought to develop improved warm mix processes for preparing durable asphalt mixtures, wherein RAP can be incorporated into the asphalt.

SUMMARY OF THE INVENTION

Accordingly, the present invention provides a process for preparing an asphalt mixture from recycled asphalt pavement (RAP), virgin aggregate, filler and first and second binder materials, comprising steps of
(a) transporting RAP through a first drum and thereby heating the RAP to a temperature of from 70 to 130° C.;
(b) transporting virgin aggregate through a second drum, thereby heating the virgin aggregate to a temperature of from 90 to 130° C.;
(c) adding a first binder material to the RAP in the first drum to provide treated RAP;
(d) optionally supplying the treated RAP from the first drum to a first storage vessel;
(e) optionally supplying the virgin aggregate from the second drum to a second storage vessel; and
(f) supplying the treated RAP from the first drum or from the first storage vessel to a mixing zone, supplying the virgin aggregate from the second drum or from the second storage vessel to the mixing zone, supplying filler to the mixing zone, supplying a second binder material to the mixing zone, and mixing to provide the asphalt mixture;
wherein the first binder material is a mineral oil, an oil of vegetable or animal origin, or a soft bitumen component having a viscosity of less than 0.3 Pa·s at 100° C. (measured according to EN 13302 at 100° C.), wherein the second binder material comprises a hard bitumen component having a penetration at 25° C. of less than 100 1/10 mm (measured according to EN 1426 at 25° C.) and optionally further comprises a soft bitumen component having a viscosity of less than 0.3 Pa·s at 100° C. (measured according to EN 13302 at 100° C.), provided that either the first binder material or the second binder material comprises a soft bitumen component having a viscosity of less than 0.3 Pa·s at 100° C. (measured according to EN 13302 at 100° C.), and wherein the hard bitumen component is added as a bitumen emulsion or as a foamed bitumen.

Adding a binder material to the RAP in the first drum promotes disintegration of the RAP such that when the treated RAP is combined with the virgin aggregate and filler, it is easier to provide a homogeneous mixture. In particular, when the treated RAP is supplied from the first drum to a storage vessel, this provides an opportunity for the first binder material to penetrate through the RAP, promoting further disintegration of the RAP. The present inventors have found that because the first binder material promotes disintegration of the RAP, asphalt of acceptable durability can be prepared even at the temperatures typically used during a warm mix process.

DETAILED DESCRIPTION OF THE INVENTION

Figure 1:
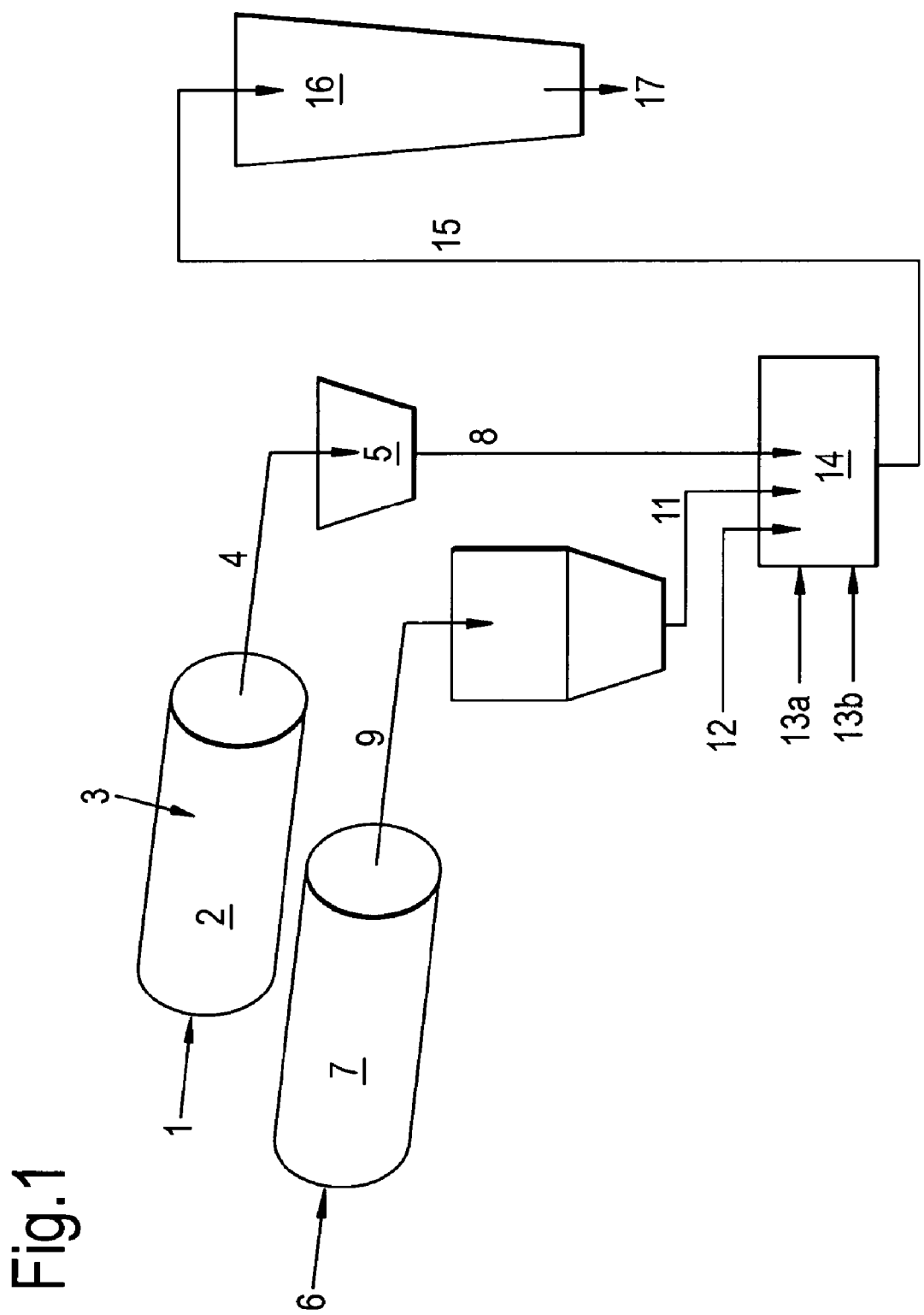
FIG. 1 is a schematic diagram showing a process according to an embodiment of the invention.

In the process of the invention, an asphalt mixture is prepared from recycled asphalt pavement (RAP), virgin aggregate, filler and one or more binder materials. The RAP may be derived from dense graded or open graded asphalt. The RAP is preferably crushed and sieved before use, and optionally is also washed before use.

The amount of RAP in the asphalt mixture is desirably maximized because this is an inexpensive and readily available product that is often considered to be a waste product. Preferably the amount of RAP is more than 30 wt %, based upon the weight of the asphalt mixture, more preferably more than 50 wt %.

The RAP is transported through a first drum. Drums suitable for heating RAP are known to the skilled person. Preferably the drum is an inclined drum with a burner mounted at the higher end. A typical inclination is about 3-4°. Preferably the drum is made of steel. Preferred heaters are oil or gas burners. Preferably the drum contains flights that move the RAP along the length of the drum and promote heat exchange between the hot gases and the RAP. Preferably all the gases from the first drum are supplied to the second drum rather than released to the atmosphere. The first drum is preferably from 7 to 12 m in length and from 1.5 to 3 m in diameter.

The RAP is heated to a temperature of from 70 to 130° C., more preferably of from 90 to 120° C. and most preferably about 115° C. It is not desirable to heat the RAP above 130° C. because at such temperatures there is an increased risk that the binder in the RAP could oxidise and harden. However, it is desirable to heat the RAP above 70° C., preferably above 90° C., most preferably to about 115° C., thereby minimising the heat that must be transferred from the virgin aggregate to the RAP in the mixing zone.

The virgin aggregate is typically any suitable aggregate that is used in asphalt mixtures. The types and grade of virgin aggregate will depend upon the desired properties of the asphalt mixture and also the aggregate that is present in the RAP.

The amount of virgin aggregate is preferably minimised as this is a more expensive and less sustainable product than RAP, but it is necessary to have sufficient virgin aggregate to achieve the required temperature in the mixing zone and to achieve the required sieve grading of aggregate in the asphalt mixture. Preferably the amount of virgin aggregate is less than 70 wt %, based upon the weight of the asphalt mixture, more preferably less than 55 wt %.

The virgin aggregate is transported through a second drum. Drums suitable for heating virgin aggregate are known to the skilled person. Preferably the drum is an inclined drum, e.g. a steel drum, with a burner. A typical inclination is about 3-4°. The burner may be mounted at either end of the drum, but is preferably mounted at the lower end. Preferred heaters are oil or gas burners. Preferably the drum contains flights that move the virgin aggregate along the length of the drum. Preferably an emission control system is associated with the drum so that emissions from the drum are cleaned before being released to the atmosphere. The gases are preferably filtered and fine particles are captured. Preferably these fine particles are supplied to the mixing zone as recycled filler. The second drum is preferably from 7 to 12 m in length and from 1.5 to 3 m in diameter.

The virgin aggregate is heated to a temperature of from 90 to 130° C. in the second drum, more preferably from 100 to 130° C. and most preferably from 110 to 130° C.

The first drum and the second drum are preferably unconnected, independent units. However, in one embodiment of the invention, the drums may be concentric, e.g. the second drum may be located inside the first drum.

A first binder material is added to the RAP in the first drum, thereby providing treated RAP. The first binder material is a mineral oil, an oil of vegetable or animal origin, or a soft bitumen component having a viscosity of less than 0.3 Pa·s at 100° C. (measured according to EN 13302 at 100° C.) The first binder material preferably has a high aromatic content to compensate for the lower aromatic content of the RAP. The aromatic components through their solvency capacity will rejuvenate the aged binder. The aromatic content of the first binder material is preferably above 30%, more preferably above 40% and most preferably above 60%. The chemical nature of the first binder material can be assessed by separation techniques such as a combination of heptane precipitation and High Pressure Liquid Chromatography (HPLC) or by Clay Gel Analysis (ASTM D 2007). The dynamic viscosity of the first binder material at 100° C. is preferably from 3 to 3000 mPa·s, and more preferably from 10 to 200 mPa·s (measured according to EN 13302). In one embodiment, the first binder material is a mineral oil or an oil of vegetable or animal origin. A suitable mineral oil might be a solvent dewaxed heavy paraffinic oil. A suitable vegetable oil might be palm oil or rapeseed oil. In another embodiment, the first binder material is a soft bitumen component having a viscosity of less than 0.3 Pa·s at 100° C. (measured according to EN 13302 at 100° C.).

The first binder material that is added to the RAP may comprise more than type of binder material. A blend of binder materials may be added to the RAP, or different binder materials may be simultaneously or sequentially added to the RAP.

The amount of first binder material that is added to the RAP is chosen bearing in mind the need to promote disintegration of the RAP and also the need to control the grade of the final properties of the asphalt mixture. A suitable quantity of first binder material is likely to be in the range of from 0.1 to 10 wt %, more preferably from 0.5 to 2 wt % based upon the weight of the RAP.

If the first drum is an inclined steel drum with a burner mounted at the higher end, the preferred position of adding the first binder material is a balance between adding the first binder material near the higher end of the drum to maximize mixing of the RAP and first binder material in the drum, and adding the first binder material away from the higher end of the drum to minimize the risk of the first binder material degrading due to proximity to the burner. In one embodiment, the first drum may have a shield, dividing the drum into a higher zone (where the burner is located) and a lower zone, and the first binder material is added into the lower zone so that it is shielded from the burner.

The first binder material is preferably added as a liquid, so it may be necessary to heat the first binder material (especially bitumen materials) before adding to the first drum. The mode of adding the first binder material to the drum is not critical, e.g. the first binder material may be sprayed or poured into the first drum.

Preferably the treated RAP is supplied from the first drum to a first storage vessel. This provides an opportunity for the first binder material to penetrate through the RAP, promoting further disintegration of the RAP. The kinetics of the penetration of the first binder material through the RAP depends on the aromaticity of the first binder material, on its viscosity at the temperature in the storage vessel and on the residence time. The higher the aromaticity or the longer the residence time or the lower the viscosity, the better the penetration. The volume of the first storage vessel should be chosen in view of the throughput of the process and the required residence time. The RAP preferably remains in the storage vessel for a time period of from 1 minute to 2 hours, more preferably from 5 minutes to 30 minutes, most preferably from 10 minutes to 20 minutes. The time should be sufficiently long that the first binder material can penetrate through the RAP and the RAP structure is weakened such that it can be broken down in the mixing zone. Coarse RAP is likely to require longer storage than fine RAP. The time should not be more than 2 hours because there is a risk that the first binder material could start to oxidise in the storage vessel, leading to a deterioration in the properties of the asphalt mixture product. Preferably no heat is supplied to the first storage vessel, but it is expected that the RAP remains in the storage vessel for a sufficiently short time that it retains much of its heat from the first drum. Preferably the first storage vessel is insulated such that heat is retained within the storage vessel.

In some embodiments of the invention, the virgin aggregate is supplied from the second drum, preferably via a screening unit, to a second storage vessel. However, in other embodiments the virgin aggregate is supplied directly from the second drum to the mixing zone. The second storage vessel is preferably either heated or insulated such that the virgin aggregate does not cool significantly in the second storage vessel, e.g. does not cool by more than 20° C. The second storage vessel may consist of one or more hot bins, and the virgin aggregate may be supplied to the hot bins via a screening unit such that different grades of aggregate are stored in different bins.

The treated RAP is supplied from the first drum or from the first storage vessel to a mixing zone. The hot and dried virgin aggregate is supplied from the second drum or from the second storage vessel to the mixing zone. Filler is supplied to the mixing zone. A second binder material is supplied to the mixing zone. The treated RAP, filler, virgin aggregate and second binder material are mixed to provide the asphalt mixture.

The filler can be recycled filler or virgin filler. Recycled filler is fine particulate material that has been recovered from the filtration system of the second drum. It is desirable to use recycled filler because this reduces the waste produced in the process. Suitable virgin filler includes limestone or fly ash. The amount of filler in the asphalt mixture is preferably from 2 to 10 wt %, based upon the weight of the asphalt mixture.

The second binder material comprises a hard bitumen component having a penetration at 25° C. of less than 100 1/10 mm (measured according to EN 1426 at 25° C.) and optionally further comprises a soft bitumen component having a viscosity of less than 0.3 Pa·s at 100° C. (measured according to EN 13302 at 100° C.). The hard bitumen component is added as a bitumen emulsion or as a foamed bitumen, preferably as a foamed bitumen.

The second binder material may comprise more than one type of binder material. A blend of binder materials may be added to the mixing zone, or different binder materials may be simultaneously or sequentially added to the mixing zone.

The amount of second binder material that is added to the mixing zone is chosen bearing in mind the need to control the grade of the final properties of the asphalt mixture. The binder in the final asphalt mixture will come from the binder in the RAP, the first binder material and the second binder material, and the skilled person is able to calculate the required amounts and grades of first binder material and second binder material based upon the required grade of the asphalt mixture product. A suitable quantity of second binder material is likely to be in the range of from 1 to 10 wt %, preferably of from 2 to 4 wt % based upon the weight of the asphalt mixture.

In a preferred embodiment of the invention, the mixing zone is a mill, e.g. a pug mill, that is separate from the first drum and the second drum. In an alternative embodiment of the invention, the mixing zone is part of the second drum. Drum mixers, including counterflow drum mixers, are known to the skilled person. A drum mixer comprises a heating/drying zone and a mixing zone. In this embodiment, the second drum (through which the virgin aggregate is transported) is the heating/drying zone of a drum mixer. The virgin aggregate is transported through the heating/drying zone of the drum mixer and then is supplied to the mixing zone of the drum mixer. The treated RAP is supplied from the first drum or from the first storage vessel to the mixing zone of the drum mixer. The second binder material is supplied to the mixing zone of the drum mixer. Mixing of the treated RAP, the filler, the virgin aggregate and the second binder material takes place in the mixing zone of the drum mixer.

The temperature in the mixing zone is preferably in the range of from 100° C. to 130° C. Preferably no additional heat is supplied to the mixing zone; the heat comes from the heat of the materials supplied to the mixing zone. The temperature in the mixing zone must be sufficiently high that the components can be homogeneously mixed, but it is desirable to minimise the temperature for cost and environmental reasons.

The mixing preferably takes place for at least 10 seconds, more preferably for at least 40 seconds and less than 70 seconds, and most preferably about 60 seconds.

In step (f) the treated RAP, the virgin aggregate, the filler and the second binder material may be added to the mixing zone in any order. However, it is preferred that the treated RAP and the virgin aggregate are added to the mixing zone, prior to addition of the filler and a second binder material.

This is because the abrasion created by the virgin aggregate can help to further break down the treated RAP.

In a preferred embodiment of the process of the invention, the asphalt mixture is prepared from RAP, filler, virgin aggregate and one or more binder materials and some or all of the RAP is derived from porous asphalt. Porous asphalt is a gap graded asphalt mixture with interconnecting voids that allow water to flow freely through the material. The binder in the porous asphalt is exposed to oxygen in the atmosphere and is subject to oxidation and consequent embrittlement. Therefore, in RAP derived from porous asphalt, the binder has typically undergone severe aging and is very hard. Because the binder is very hard, it is difficult to break down RAP derived from porous asphalt and it has proved difficult to produce homogeneous asphalt mixtures when using RAP derived from porous asphalt. Therefore, the process of the present invention, wherein the first binder material is supplied to the RAP, thereby promoting disintegration of the RAP, is particularly suitable for use with RAP derived from porous asphalt.

RAP derived from porous asphalt can be used to make dense asphalt mixtures or porous asphalt mixtures. When making porous asphalt mixtures, it is especially important to ensure that the asphalt mixture is homogeneous. Therefore, the process of the present invention is also particularly suitable when making porous asphalt mixtures from RAP. The process of the present invention is especially suitable when using RAP derived from porous asphalt to make a porous asphalt mixture.

In the embodiment where some or all of the RAP is derived from porous asphalt, the amount of RAP is preferably up to 60 wt % based upon the weight of the asphalt mixture, more preferably about 40 wt %. The RAP is preferably supplied from the first drum to a storage vessel and is preferably retained in the storage vessel for a period of from 5 to 60 minutes, preferably about 20 minutes. This enables the first binder material to impregnate the RAP derived from porous asphalt and break down the aged binder in the RAP. Preferably the mixing zone is a mill such as a pug mill. The components in the mixing zone are preferably mixed for a period of about 60 seconds.

The asphalt mixture produced by the process of the invention can be used to form asphalt pavement using conventional pavement-laying equipment.

FIG. 1 shows an embodiment of the process of the invention. RAP is supplied (1) to the first drum (2). The RAP is transported through the first drum (2) and dried and heated. The first binder material is supplied (3) to the first drum (2). The first binder material mixes with the RAP and starts to break down the RAP. The treated RAP from the first drum (2) is supplied (4) to a storage vessel (5). Whilst the treated RAP is retained in the storage vessel (5) the first binder material further penetrates the RAP and the RAP disintegrates further. Virgin aggregate is supplied (6) to the second drum (7). The virgin aggregate is transported through the second drum (7) and dried and heated, and is then supplied (9) to the screening and hot storage unit (10). The treated RAP is supplied (8) from the storage vessel (5) to the mixer (14), the virgin aggregate is supplied (11) from the screening and hot storage unit (10) to the mixer (14), filler is supplied (12) to the mixer (14) and a second binder material is supplied (13) to the mixer (14). The second binder material can be supplied as two streams (13a) and (13b), e.g. can be supplied in the form of a soft bitumen component (13a) and a foamed hard bitumen component (13b) or possibly as a bitumen emulsion (13b). The components are mixed in the mixer (14), producing a homogeneous asphalt mixture. The asphalt mixture is supplied (15) to a storage vessel (16) before it is transported (17) for use.

Figure 2:
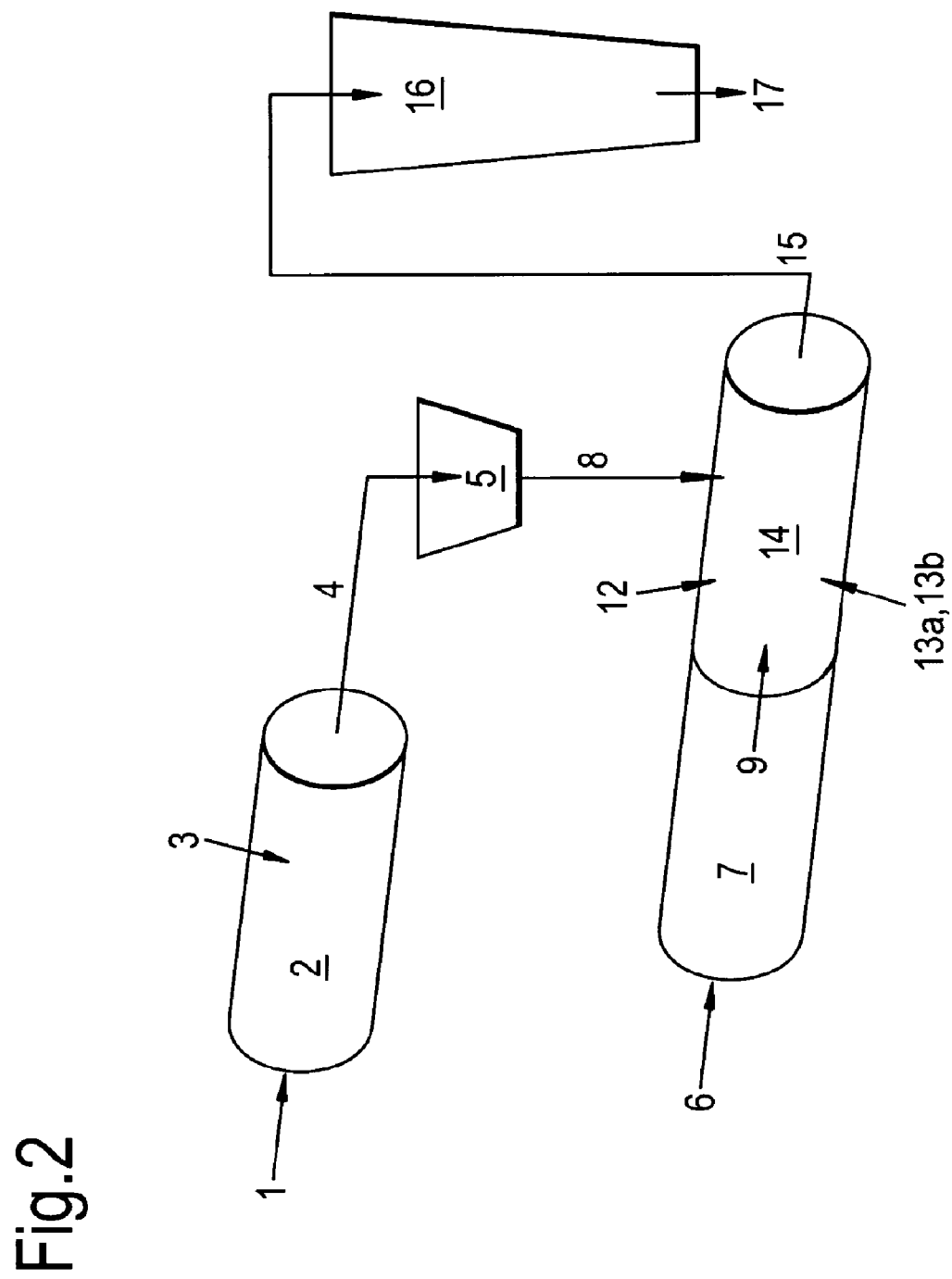
FIG. 2 is a schematic diagram showing a process according to another embodiment of the invention.

FIG. 2 shows another embodiment of the process of the invention. The steps and apparatus are the same as in FIG. 1 except that a drum mixer is used instead of a separate drum and mixer. The virgin aggregate is supplied (9) from the heating and drying zone (7) of the drum mixer to the mixing zone (14) of the drum mixer. The RAP is supplied (8) from the storage vessel (5) to the mixing zone (14), the filler is supplied (12) to the mixing zone (14) and the second binder material is supplied (13) to the mixing zone (10).

Figure 3:
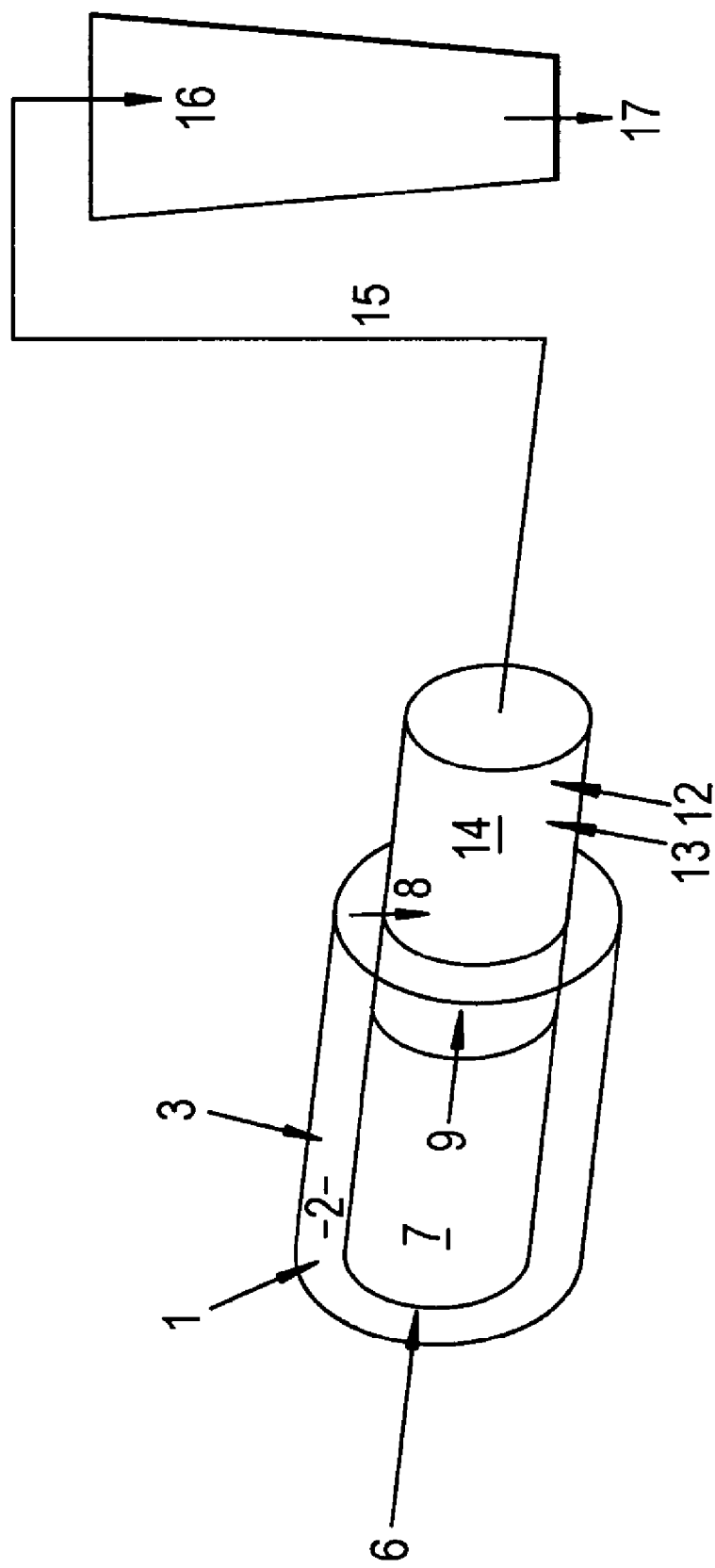
FIG. 3 is a schematic diagram showing a process according to another embodiment of the invention.

FIG. 3 shows another embodiment of the process of the invention. The steps and apparatus are the same as in FIG. 2 except that a concentric drum is used instead of separate drums for heating and drying the RAP and the virgin aggregate. The RAP is supplied to a first drum (2) that is the outer drum of two concentric drums. The virgin aggregate is supplied to the inner drum (7) that is the inner drum of two concentric drums. The RAP is supplied (8) from the outer drum, directly to the mixing zone (14) of the drum mixer.

EXAMPLES

The invention will now be described by reference to examples which are not intended to be limiting of the invention.

Choice of Oils as First Binder Material

Two oils were assessed for their suitability as a first binder material: Catenex® SNR, a solvent dewaxed heavy paraffinic oil available from Shell, and Flux Shell® 1000, a brightstock furfural extract available from Shell. The viscosity was measured according to EN 13302 at 100° C. and the proportions of aromatics, saturates, resins and asphaltenes were measured according to ASTM D 2007. The properties of the two materials are given in table 1:

TABLE 1

|  | Catenex ® SNR | FluxShell ® 1000 |
| --- | --- | --- |
| Kin viscosity @100° C. | 14 mm$^2$/s | 60 mm$^2$/s |
| Aromatics | 44% | 70% |
| Saturates | 55% | 10% |
| Resins | 1% | 20% |
| Asphaltenes | ~0% | ~0% |

FluxShell ® has a higher aromaticity than Catenex ® SNR.

Binder recovered from porous asphalt RAP was characterised. The penetration was measured according to EN 1426 at 25° C. The ring and ball temperature was measured according to EN 1427. The results for the recovered binder and comparative results for a commercial 70/100 grade bitumen are given in table 2:

TABLE 2

|  | Recovered Binder | 70/100 Bitumen |
| --- | --- | --- |
| Penetration @25° C. | 13 1/10 mm | 83 1/10 mm |
| Ring and ball temperature | 69° C. | 46.0° C. |
| Aromatics | 45% | 59% |
| Saturates | 5% | 7% |
| Resins | 30% | 22% |
| Asphaltenes | 20% | 12% |

The asphaltene and resin contents of the recovered binder are significantly higher than the ones of the fresh bitumen.

Blends of the recovered binder and the first binder material were prepared. A first blend consisted of 20% Catenex® SNR and 80% recovered binder, and had a penetration at 25° C. (measured according to EN 1426) of 99 1/10 dmm and a ring and ball temperature (measured according to EN 1427) of 44.4° C. A second blend consisted of 30% FluxShell® 1000 and 70% recovered binder, and had a penetration at 25° C. (measured according to EN 1426) of 106 1/10 dmm and a ring and ball temperature (measured according to EN 1427) of 43.2° C.

The two blends were subjected to the rolling thin-film oven test (RTFOT) and the penetration and ring and ball temperature of the aged blends were measured. The first blend (20% Catenex® SNR; 80% recovered binder) had a penetration after RTFOT of 72 1/10 mm (73% retained penetration) and a ring and ball temperature of 47.8° C. (an increase of 3.4° C.). The second blend (30% FluxShell 1000; 70% recovered binder) had a penetration after RTFOT of 83 1/10 mm (78% retained penetration) and a ring and ball temperature of 45.0° C. (an increase of 1.8° C.).

Both the Catenex® SNR and the FluxShell® 1000 are suitable for use as first binder materials.

That which is claimed is:

1. A process for preparing an asphalt mixture from recycled asphalt pavement (RAP), virgin aggregate, filler and first and second binder materials, comprising steps of
   (a) transporting RAP through a first drum and thereby heating the RAP to a temperature of from 70 to 130° C.;
   (b) transporting virgin aggregate through a second drum, thereby heating the virgin aggregate to a temperature of from 90 to 130° C.;
   (c) adding a first binder material to the RAP in the first drum to provide treated RAP; and
   (d) supplying the treated RAP from the first drum to a mixing zone, supplying the virgin aggregate from the second drum to the mixing zone, supplying filler to the mixing zone, supplying a second binder material to the mixing zone, and mixing to provide the asphalt mixture; wherein the first binder material is a mineral oil or an oil of vegetable or animal origin, wherein the second binder material comprises a hard bitumen component having a penetration at 25° C. of less than 100 1/10mm (measured according to EN 1426 at 25° C.) and further comprises a soft bitumen component having a viscosity of less than 0.3 Pa·s at 100° C. (measured according to EN 13302 at 100° C.), and wherein the hard bitumen component is added as a bitumen emulsion or as a foamed bitumen.

2. A process according to claim 1, wherein some or all of the RAP is derived from porous asphalt.

3. A process according to claim 1, wherein the asphalt mixture is a porous asphalt mixture.

4. A process according to claim 1, wherein the hard bitumen component is added as a foamed bitumen.

5. A process according to claim 1, wherein in step (d) the treated RAP and the virgin aggregate are added to the mixing zone prior to addition of the filler and the second binder material.

6. A process for preparing an asphalt mixture from recycled asphalt pavement (RAP), virgin aggregate, filler and first and second binder materials, comprising steps of
   (a) transporting RAP through a first drum and thereby heating the RAP to a temperature of from 70 to 130° C.;
   (b) transporting virgin aggregate through a second drum, thereby heating the virgin aggregate to a temperature of from 90 to 130° C.;
   (c) adding a first binder material to the RAP in the first drum to provide treated RAP; and
   (d) supplying the treated RAP from the first drum to a mixing zone, supplying the virgin aggregate from the second drum to the mixing zone, supplying filler to the mixing zone, supplying a second binder material to the mixing zone, and mixing to provide the asphalt mixture; wherein the first binder material is a soft bitumen component having a viscosity of less than 0.3 Pa·s at 100° C. (measured according to EN 13302 at 100° C., wherein the second binder material comprises a hard bitumen component having a penetration at 25° C. of less than 100 1/10mm (measured according to EN 1426 at 25° C.) and wherein the hard bitumen component is added as a bitumen emulsion or as a foamed bitumen.

7. A process according to claim 6, further comprising: supplying the treated RAP from the first storage vessel to a mixing zone, supplying the virgin aggregate from the second drum to the mixing zone, supplying filler to the mixing zone, supplying a second binder material to the mixing zone, and mixing to provide the asphalt mixture.

8. A process according to claim 7, wherein the second binder material further comprises a soft bitumen component having a viscosity of less than 0.3 Pa·s at 100° C. (measured according to EN 13302 at 100° C.).

9. A process according to claim 7, wherein treated RAP is retained in the first storage vessel for a period of from 5 to 60 minutes.

10. A process according to claim 7, wherein some or all of the RAP is derived from porous asphalt.

11. A process according to claim 7, wherein the asphalt mixture is a porous asphalt mixture.

12. A process according to claim 7, wherein the hard bitumen component is added as a foamed bitumen.

13. A process according to claim 7, wherein the treated RAP and the virgin aggregate are added to the mixing zone prior to addition of the filler and the second binder material.

14. A process according to claim 12, further comprising: supplying the treated RAP from the first storage vessel to a mixing zone, supplying the virgin aggregate from the second storage vessel to the mixing zone, supplying filler to the mixing zone, supplying a second binder material to the mixing zone, and mixing to provide the asphalt mixture.

15. A process according to claim 14, wherein the second binder material further comprises a soft bitumen component having a viscosity of less than 0.3Pa·s at 100° C. (measured according to EN 13302 at 100° C.).

16. A process according to claim 14, wherein treated RAP is retained in the first storage vessel for a period of from 5 to 60 minutes.

17. A process according to claim 14, wherein some or all of the RAP is derived from porous asphalt.

18. A process according to claim 14, wherein the asphalt mixture is a porous asphaltmixture.

19. A process according to claim 14, wherein the hard bitumen component is added as a foamed bitumen.

20. A process according to claim 14, wherein the treated RAP and the virgin aggregate are added to the mixing zone prior to addition of the filler and the second binder material.

21. A process for preparing an asphalt mixture from recycled asphalt pavement (RAP), virgin aggregate, filler and first and second binder materials, comprising steps of
   (a) transporting RAP through a first drum and thereby heating the RAP to a temperature of from 70 to 130° C.;
   (b) transporting virgin aggregate through a second drum, thereby heating the virgin aggregate to a temperature of from 90 to 130° C.;
   (c) adding a first binder material to the RAP in the first drum to provide treated RAP;

(d) supplying the treated RAP from the first drum to a first storage vessel; and (e) supplying the treated RAP from the first storage vessel to a mixing zone, supplying the virgin aggregate from the second drum to the mixing zone, supplying filler to the mixing zone, supplying a second binder material to the mixing zone, and mixing to provide the asphalt mixture;

wherein the first binder material is a mineral oil or an oil of vegetable or animal origin, wherein the second binder material comprises a hard bitumen component having a penetration at 25° C. of less than 100 1/10mm (measured according to EN 1426 at 25° C.) and further comprises a soft bitumen component having a viscosity of less than 0.3 Pa·s at 100° C. (measured according to EN 13302 at 100° C.), and wherein the hard bitumen component is added as a bitumen emulsion or as a foamed bitumen.

22. A process according to claim 21, wherein treated RAP is retained in the first storage vessel for a period of from 5 to 60 minutes.

23. A process according to claim 21, wherein some or all of the RAP is derived from porous asphalt.

24. A process according to claim 21, wherein the asphalt mixture is a porous asphalt mixture.

25. A process according to claim 21, wherein the hard bitumen component is added as a foamed bitumen.

26. A process according to claim 21, wherein in the treated RAP and the virgin aggregate are added to the mixing zone prior to addition of the filler and the second binder material.

27. A process according to claim 26, further comprising: supplying the treated RAP from the first storage vessel to a mixing zone, supplying the virgin aggregate from the second storage vessel to the mixing zone, supplying filler to the mixing zone, supplying a second binder material to the mixing zone, and mixing to provide the asphalt mixture.

28. A process according to claim 27, wherein treated RAP is retained in the first storage vessel for a period of from 5 to 60 minutes.

29. A process according to claim 27, wherein some or all of the RAP is derived from porous asphalt.

30. A process according to claim 27, wherein the asphalt mixture is a porous asphalt mixture.

31. A process according to claim 27, wherein the hard bitumen component is added as a foamed bitumen.

32. A process according to claim 27, wherein the treated RAP and the virgin aggregate are added to the mixing zone prior to addition of the filler and the second binder material.

* * * * *